US011572951B2

(12) United States Patent
Adachi et al.

(10) Patent No.: US 11,572,951 B2
(45) Date of Patent: Feb. 7, 2023

(54) GASKET-MOUNTING STRUCTURE

(71) Applicant: NIPPON PILLAR PACKING CO., LTD., Osaka (JP)

(72) Inventors: Tomohiro Adachi, Osaka (JP); Toshihide Iida, Osaka (JP); Tomoyuki Koike, Osaka (JP); Atsushi Nakano, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 56 days.

(21) Appl. No.: 16/981,848

(22) PCT Filed: Jan. 15, 2019

(86) PCT No.: PCT/JP2019/000892
§ 371 (c)(1),
(2) Date: Sep. 17, 2020

(87) PCT Pub. No.: WO2019/187504
PCT Pub. Date: Oct. 3, 2019

(65) Prior Publication Data
US 2020/0408305 A1 Dec. 31, 2020

(30) Foreign Application Priority Data
Mar. 28, 2018 (JP) .............................. JP2018-061930

(51) Int. Cl.
*F16J 15/10* (2006.01)
(52) U.S. Cl.
CPC .................................. *F16J 15/104* (2013.01)
(58) Field of Classification Search
CPC ......... F16J 15/104; F16J 15/106; F16J 15/102
See application file for complete search history.

(56) References Cited

U.S. PATENT DOCUMENTS 4,303,251 A * 12/1981 Harra ................... F16J 15/0881
277/614
5,466,018 A * 11/1995 Stobbart ................ F16L 23/20
277/614

(Continued)

FOREIGN PATENT DOCUMENTS

CN          1502841 A      6/2004
JP      2006-153180 A      6/2006

(Continued)

OTHER PUBLICATIONS

International Search Report dated Feb. 26, 2019 in PCT/JP2019/000892 filed on Jan. 15, 2019, citing documents AA, AB and AO-AS therein, 2 pages.

(Continued)

*Primary Examiner* — Eugene G Byrd
(74) *Attorney, Agent, or Firm* — Oblon, McClelland, Maier & Neustadt, L.L.P.

(57) ABSTRACT

A gasket-mounting structure includes a mounting member and a gasket. The mounting member includes a first base, an outer sleeve protruding from the first base, an inner sleeve protruding from the first base in the same direction of the outer sleeve radially inside the outer sleeve, and a groove surrounded by the first base, the outer sleeve, and the inner sleeve. The gasket includes an annular second base, an annular outer protrusion extending from the second base to be pressed in the groove, and an annular inner protrusion extending from the second base to be axially pressed on the inner sleeve radially inside the outer protrusion such that the inner sleeve is radially placed between the outer protrusion and the inner protrusion.

4 Claims, 6 Drawing Sheets

(56) References Cited

U.S. PATENT DOCUMENTS

| | | | | |
|---|---|---|---|---|
| 5,687,975 | A * | 11/1997 | Inciong | F16J 15/104 |
| | | | | 277/651 |
| 7,581,764 | B2 * | 9/2009 | Ishihara | F16J 15/104 |
| | | | | 285/331 |
| 11,158,522 | B2 * | 10/2021 | Melcer | F16J 15/106 |
| 2011/0163540 | A1 | 7/2011 | Towle et al. | |
| 2013/0307265 | A1 | 11/2013 | Sekino | |
| 2014/0217681 | A1 * | 8/2014 | Vu | F16L 23/18 |
| | | | | 277/627 |
| 2017/0067583 | A1 * | 3/2017 | Illakowicz | F16J 15/106 |
| 2017/0159854 | A1 | 6/2017 | Fujii et al. | |
| 2019/0368611 | A1 * | 12/2019 | Nakano | F16L 23/22 |
| 2019/0390773 | A1 * | 12/2019 | Adachi | F16L 17/073 |
| 2020/0393068 | A1 * | 12/2020 | Nakano | F16J 15/062 |
| 2021/0088141 | A1 * | 3/2021 | Nakano | F16J 15/061 |

FOREIGN PATENT DOCUMENTS

| | | | |
|---|---|---|---|
| JP | 2006-307983 A | 11/2006 | |
| JP | 2011-503449 A | 1/2011 | |
| JP | 2016-70388 A | 5/2016 | |
| JP | 2019173844 A * | 10/2019 | F16J 15/104 |
| WO | WO 2017/176815 A1 | 10/2017 | |

OTHER PUBLICATIONS

Combined Chinese Office Action and Search Report dated Apr. 26, 2022, in corresponding Chinese Patent Application No. 201980008345.2 (with English Translation and English Translation of Category of Cited Documents) citing document AO therein, 20 pages.

* cited by examiner

GASKET-MOUNTING STRUCTURE

TECHNICAL FIELD

The invention relates to gasket-mounting structures.

BACKGROUND ART

Known gasket-mounting structures can be used in equipment for manufacturing semiconductors and the like. See e.g. Patent Literature 1. Such gasket-mounting structures have an H-section gasket whose concave portion receives a protrusion of a mounting member.

CITATION LIST

Patent Literature

Patent Literature 1: JP 2006-307983 A

SUMMARY OF INVENTION

Such conventional gasket-mounting structures can generate sealing forces in radial directions of a gasket mounted on a mounting member to seal gaps between the gasket and the mounting member. However, the sealing performance of the gasket is insufficient, and its further improvement is desired.

In view of the fact, the invention is devised. An object of the invention is to improve the sealing performance between a gasket and a mounting member.

A gasket-mounting structure according to the invention includes a mounting member including:
 a first base having a fluid channel;
 an outer sleeve protruding from the first base;
 an inner sleeve protruding from the first base in the same direction as the outer sleeve radially inside the outer sleeve and having a hole communicating with the fluid channel; and
 a groove surrounded by the first base, the outer sleeve, and the inner
sleeve and open to the direction in which the outer sleeve protrudes;
and a gasket including:
 an annular second base;
 an annular outer protrusion extending from the second base to be pressed in the groove of the mounting member; and
 an annular inner protrusion extending from the second base to be axially pressed on the inner sleeve of the mounting member radially inside the outer protrusion such that the inner sleeve is radially placed between the outer protrusion and the inner protrusion.

This structure allows the outer protrusion of the gasket to be pressed in the groove of the mounting member to generate radial sealing forces between the gasket and the mounting member. In addition, the structure allows the inner sleeve of the mounting member to be axially pressed on the inner protrusion of the gasket to generate axial sealing forces between the gasket and the mounting member. Thus, the structure can improve the sealing performance of the gasket and the mounting member.

When the inner sleeve of the mounting member contacts the inner protrusion of the gasket, an inner periphery of the inner sleeve and an inner periphery of the inner protrusion may form walls of fluid channels communicating with each other. A tip of the inner protrusion may have an inner diameter equal to or larger than the minimum inner diameter of the inner sleeve. The inner periphery of the inner protrusion may have a first inner peripheral surface that reduces the inner diameter of the inner protrusion with increase in axial direction from the tip of the inner protrusion.

This structure allows, when the outer protrusion of the gasket is pressed in the groove of the mounting member, the outer protrusion to push the inner sleeve of the mounting member radially inward. Since the inner sleeve is radially placed between the outer protrusion and the inner protrusion of the gasket, the inner protrusion is pushed by the inner sleeve radially inward. This deforms the inner protrusion to move the first inner peripheral surface radially inward. The above-described shape of the first inner peripheral surface can prevent the deformed inner protrusion from protruding toward the inside of the fluid channel of the gasket. As a result, no obstructions against the flow between the gasket and the mounting member exist in the volume where the mounting member communicates with the gasket after the gasket is mounted on the mounting member. This ensures smoothness of the flow, thus being able to quickly replace fluids flowing between the mounting member and the gasket.

The first inner peripheral surface may be tapered.

The first inner peripheral surface may be convex toward the radial inside of the gasket.

When the outer protrusion of the gasket is pressed in the groove of the mounting member, the structure can change the inner peripheral surface of the inner protrusion into a smoother surface, which can maintain a constant cross-section area of the fluid channel of the inner protrusion with a higher degree of accuracy. This can enhance smoothness of the flows in the fluid channel.

The invention can improve the sealing performance between the gasket and the mounting member.

DESCRIPTION OF EMBODIMENTS

The following explains an embodiment of the invention with reference to the drawings.

Figure 1:
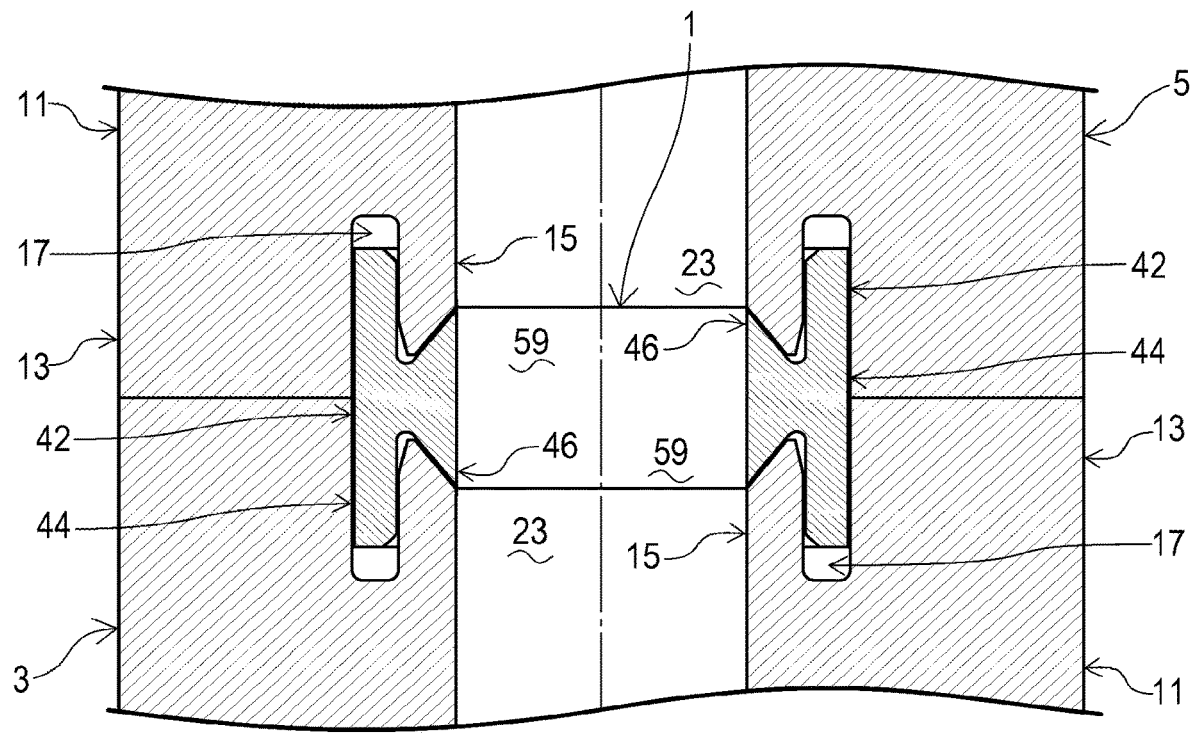
FIG. 1 is a cross-section view of a gasket-mounting structure according to an embodiment of the invention.
Figure 2:
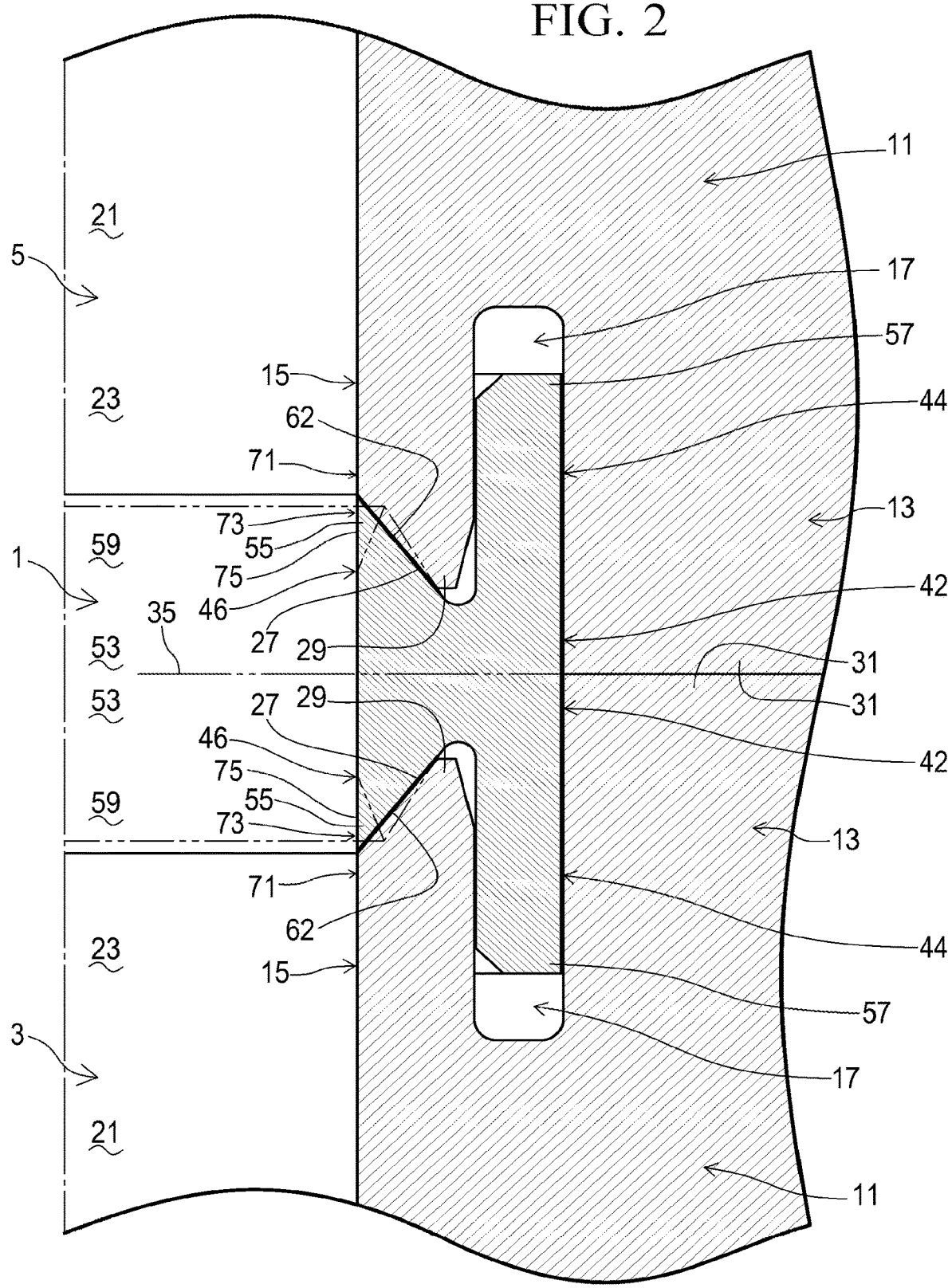
FIG. 2 is a partial enlarged view of FIG. 1.
Figure 3:
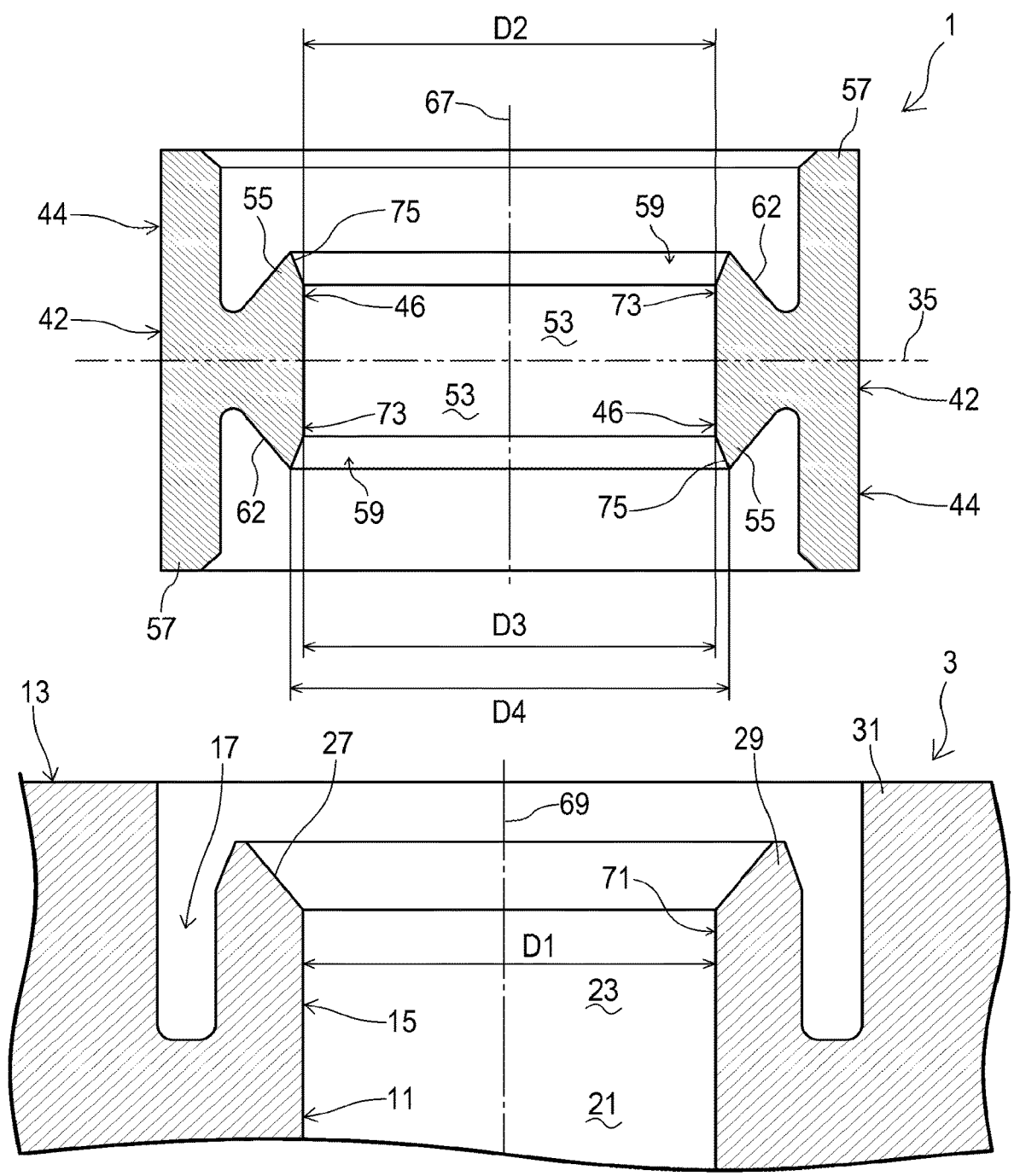
FIG. 3 is a cross-section view of the gasket and a portion of the mounting member in the gasket-mounting structure of FIG. 1.

FIG. 1 is a cross-section view of a structure for mounting a gasket 1 according to an embodiment of the invention. FIG. 2 is a partial enlarged view of FIG. 1. FIG. 3 is a cross-section view of the gasket 1 and a portion of the mounting member 3.

The direction of the mounting member 3 with respect to the gasket 1 in FIGS. 1 and 2, i.e. the downward direction in FIGS. 1 and 2, is hereinafter referred to as first axial or downward direction of the gasket 1 or the mounting member 3.

The direction of another mounting member 5 with respect to the gasket 1 in FIGS. 1 and 2, i.e. the upward direction in FIGS. 1 and 2, is hereinafter referred to as second axial or upward direction of the gasket 1 or the mounting member 3.

As shown in FIGS. 1 and 2, the structure for mounting the gasket 1 is used to mount the gasket 1 on the mounting member 3 or the other mounting member 5.

The mounting member 3 according to the invention is illustrated as a block of a fluid device, but it is not limited to such a block. The mounting member 3 may be a member related to, for example, a regulator, a pressure gauge, a valve, a flowmeter, a plastic tube, or a flange of a fluid device.

The mounting member 3 is coupled to the other mounting member 5 with the gasket 1 between the mounting member 3 and the other mounting member 5 to allow fluids, e.g. liquid such as ultrapure water or chemical, to flow through the mounting members 3 and 5.

The mounting member 3 is made from thermoplastic resin, which includes, for example, fluoropolymer such as tetrafluoroethylene-perfluoroalkyl vinyl ether copolymer (PFA), polytetrafluoroethylene (PTFE), polyvinylidene fluoride (PVDF), ethylene-tetrafluoroethylene copolymer (ETFE), and tetrafluoroethylene-hexafluoropropylene copolymer (FEP).

The mounting member 3 is not limited to fluoropolymer, but it may be made from polypropylene (PP), high-density polyethylene (HDPE), low-density polyethylene (LDPE), polyoxymethylene (POM), or elastomer, i.e. rubber.

The mounting member 3 includes a first base 11, an outer sleeve 13, an inner sleeve 15, and a groove 17. The mounting member 3 also has a body (not shown) connected with the first base 11.

The first base 11 has a first fluid channel 21, which is a hole that allows the fluids to flow therethrough. The first fluid channel 21 has a circular cross section and extends in the axial direction of the outer sleeve 13 and the inner sleeve 15, i.e. vertically in the figures.

The outer sleeve 13 is provided at the first base 11 and protrudes toward one side of the first base 11, i.e. to the second axial (i.e. upward) direction of the mounting member 3. The outer sleeve 13 is formed in a circular cylindrical shape and open to the second axial direction.

The inner sleeve 15 is provided at the first base 11 and protrudes to the same direction as the outer sleeve 15, i.e. upward. The inner sleeve 15 is formed in a circular cylindrical shape and open to the second axial direction of the mounting member 3, i.e. to the upward direction.

The inner sleeve 15 is placed radially inside the outer sleeve 13 and coaxially with the outer sleeve 13. The groove 17, which will be described later, is formed radially outside the inner sleeve 15 and radially inside the outer sleeve 13, i.e. between the inner sleeve 15 and the outer sleeve 13.

The inner sleeve 15 has a hole communicating with the hole of the first base 11 and forming a second fluid channel 23 to allow the fluids to flow therethrough. The second fluid channel 23 has a circular cross section and extends to the axial direction of the inner sleeve 15, i.e. vertically in the figures.

The second fluid channel 23 is located nearer to the axis of the inner sleeve 15 than the inner sleeve 15 and has an end communicating with the first fluid channel 21 of the first base 11. Along with the first fluid channel 21, the second fluid channel 23 forms a fluid channel of the mounting member 3.

As shown in FIG. 3, the inner sleeve 15 has a minimum inner diameter D1, which is the smallest diameter of the second fluid channel 23. The minimum inner diameter D1 is substantially equal to the smallest diameter of the hole of the first base 11, but this is not a requirement.

The inner sleeve 15 has substantially constant inner and outer diameters. The inner sleeve 15 is located radially inside the outer sleeve 13 and separated from the outer sleeve 13 by a certain distance. The outer periphery of the inner sleeve 15 is substantially parallel to the inner periphery of the outer sleeve 13.

The inner sleeve 15 has a first sealing surface 27, which is an annular tapered surface. The first sealing surface 27 is located radially inside a tip 29 (i.e. a second axial end) of the inner sleeve 15 and extends along substantially the whole circumference of the tip 29.

The inner diameter of the first sealing surface 27, i.e. the inner diameter of the tip 29, increases with increase in axial distance from the first axial end of the mounting member 3, i.e. in upward distance from the lower end of FIG. 1.

The tip 29 of the inner sleeve 15 is located nearer to the first axial (i.e. lower) end of the mounting member 3 than a tip 31 (i.e. a second axial end) of the outer sleeve 13.

The groove 17 is surrounded by the first base 11, the outer sleeve 13, and the inner sleeve 15 such that it is open to the second axial direction of the outer sleeve 13, i.e. to the upward direction.

The groove 17 is annular and forms an annular open space surrounded by the first base 11, the outer sleeve 13, and the inner sleeve 15. The groove 17 has a substantially constant width in the radial direction of the outer sleeve 13 and the inner sleeve 15.

The radial width of the groove 17 is designed, for example, to be smaller than the radial width of an outer protrusion 44 of the gasket 1, which will be described later, such that the groove 17 allows the outer protrusion 44 to be pressed therein.

The gasket 1 is mounted on the mounting member 3 to allow the fluids to flow from the mounting member 3. The gasket 1 is formed in a circular cylindrical shape to fit the groove 17.

The gasket 1 is symmetric with respect to a central plane 35, which is located at the axial center of the gasket 1 and orthogonally crosses the axis of the gasket 1. The gasket 1 is also mounted on the other mounting member 5 by using a structure similar to the above-described structure used to mount the gasket 1 on the mounting member 3.

The gasket 1 is made from thermoplastic resin, for example, fluoropolymer such as PFA, PTFE, PVDF, ETFE, or FEP.

Material of the mounting member 3 is not limited to fluoropolymer, but it may be selected among other resins such as PP, HDPE, LDPE, POM, and elastomer.

The gasket 1 includes a second base 42, an outer protrusion 44, and an inner protrusion 46.

The second base 42 is disposed at an axial center portion of the gasket 1, which is near the center plane 35. The second base 42 is formed in a circular cylindrical shape to be designed to engage with the inside of the outer sleeve 13 of the mounting member 3.

The second base 42 has a hole to allow the fluids to flow therethrough, which forms a third fluid channel 53 and has a circular cross section. The third fluid channel 53 extends along the axial direction of the second base 42, i.e. vertically in the figures.

The diameter of the third fluid channel 53, i.e. the inner diameter D2 of the second base 42 is substantially equal to the minimum inner diameter D1 of the inner sleeve 15. The inner diameter D2 is substantially constant in the axial direction of the second base 42.

The outer protrusion 44 is formed in a circular cylindrical shape to be pressed in the groove 17 of the mounting member 3. The outer protrusion 44 protrudes from the second base 42 toward the first axial direction of the gasket 1, i.e. downward.

The radial width of the outer protrusion 44 is larger than the radial width of the groove 17 such that the outer protrusion 44 can be pressed in the groove 17 to be coaxial with the outer sleeve 13 and the inner sleeve 15 of the mounting member 3.

The outer protrusion 44 has an outer diameter equal to or slightly larger than the inner diameter of the outer sleeve 13 of the mounting member 3. The outer protrusion 44 has an inner diameter smaller than the outer diameter of the inner sleeve 15 of the mounting member 3.

The inner diameter of the outer protrusion 44 is substantially constant in the axial direction of the gasket 1, i.e. throughout the length of the outer protrusion 44. When pressed in the groove 17, the outer protrusion 44 is pressed on the radial outside of the inner sleeve 15 of the mounting member 3.

The inner protrusion 46 is a circular cylindrical portion of the gasket 1 that is axially pressed on the inner sleeve 15 of the mounting member 3. The inner protrusion 46 is provided at the second base 42 and protrudes to the same direction as the outer protrusion 44, i.e. toward the first axial (i.e. downward) direction of the gasket 1.

The inner protrusion 46 is located radially inside the outer protrusion 44 so that, when the inner protrusion 46 is pressed on the inner sleeve 15 of the mounting member 3, the inner sleeve 15 is placed radially between the inner protrusion 46 and the outer protrusion 44.

A tip 55 (i.e. a first axial end) of the inner protrusion 46 is located nearer to the second axial (i.e. upper) end of the gasket 1 than a tip 57 (i.e. a first axial end) of the outer protrusion 44.

When the second base 42 is engaged with the inside of the outer sleeve 13, the inner protrusion 46 is positioned coaxially with the outer sleeve 13 and the inner sleeve 15.

The inner protrusion 46 has a hole communicating with the first fluid channel 21, i.e. the hole of the mounting member 3, and forming a fourth fluid channel 59 to allow the fluids to flow therethrough. The fourth fluid channel 59 has a circular cross section and extends along the axial direction of the inner protrusion 46, i.e. vertically in the figures.

One end of the fourth fluid channel 59 communicates with the third fluid channel 53 of the second base 42. Along with the third fluid channel 53, the fourth fluid channel 59 forms a portion of a fluid channel of the gasket 1.

The inner protrusion 46 has a second sealing surface 62, which is an annular tapered surface. The second sealing surface 62 is located at the outer periphery of the tip 55 of the inner protrusion 46 and extends along the whole circumference of the tip 55.

The outer diameter of the second sealing surface 62, i.e. the outer diameter of the tip 55 of the inner protrusion 46, decreases with increase in axial distance from the axial center of the gasket 1, i.e. the center plane 35. In figures, a lower portion of the second sealing surface 62 has a smaller outer diameter.

The second sealing surface 62 can contact the first sealing surface 27 of the inner sleeve 15 of the mounting member 3 since the second sealing surface 62 is inclined at an angle depending on the inclination angle of the first sealing surface 27.

Note that the inclination angle of the second sealing surface 62 with respect to the axis 67 of the inner protrusion 46 is different from the inclination angle of the first sealing surface 27 with respect to the axis 69 of the inner sleeve 15.

In this case, when at least either the gasket 1 or the mounting member 3 receives an external force in the axial direction caused by coupling of the mounting members 3 and 5, the second sealing surface 62 is pressed on the first sealing surface 27.

Figure 5:
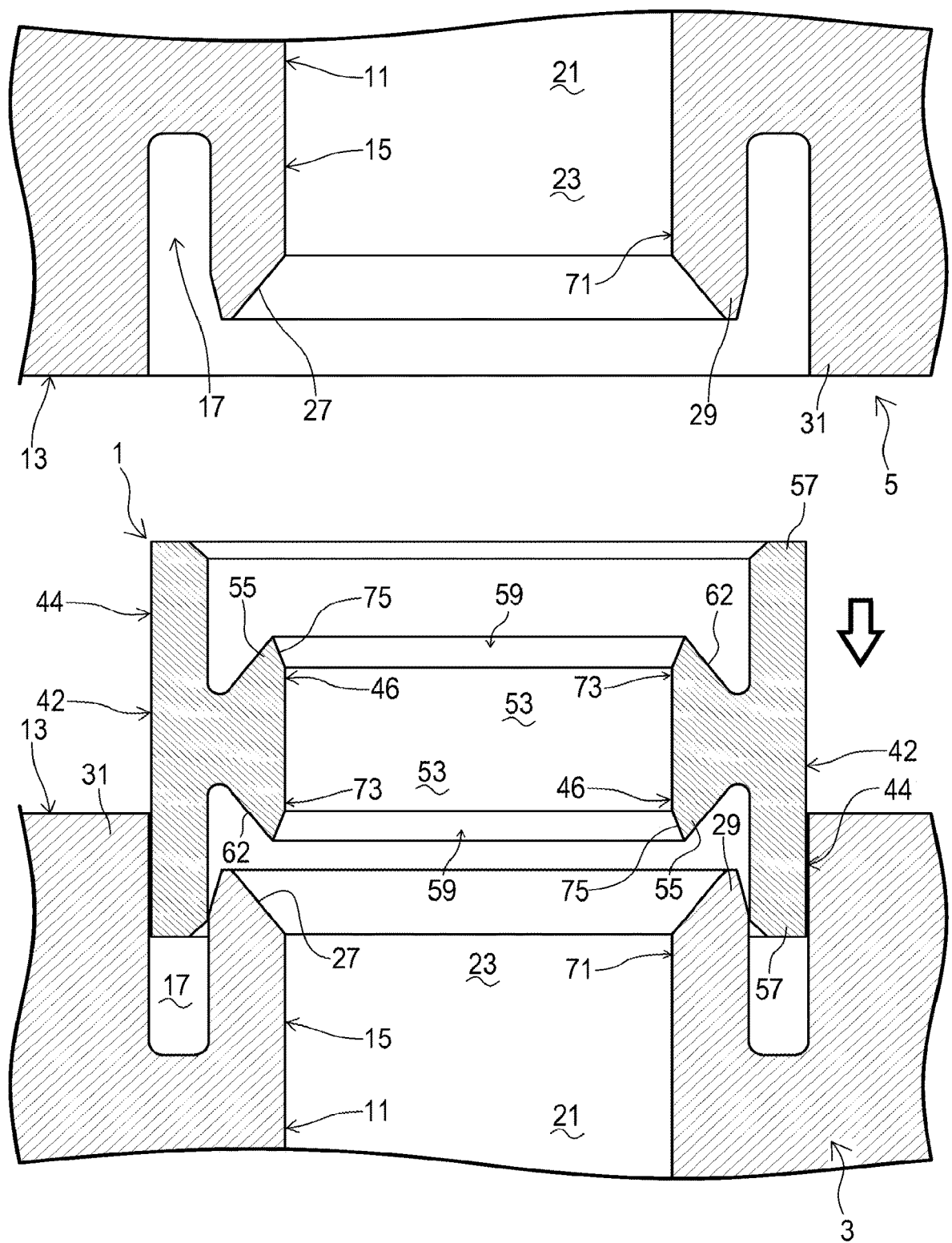
FIG. 5 is a cross-section view of the gasket-mounting structure of FIG. 1 before the gasket is mounted on the structure.

The following explains procedures for mounting the gasket 1 on the mounting member 3. At first, as shown in FIG. 5, the outer protrusion 44 of the gasket 1 is axially pressed in the groove 17 of the mounting member 3, starting from the tip 57 of the outer protrusion 44.

Next, the outer protrusion 44 is moved toward the bottom of the groove 17, i.e. downward, until the second sealing surface 62 of the inner protrusion 46 contacts the first sealing surface 27 of the inner sleeve 15.

When the second sealing surface 62 contacts the first sealing surface 27, pressing the outer protrusion 44 in the groove 17 is finished. Then, the second base 42 is engaged with the inside of the outer sleeve 13.

Subsequently, similar procedures are performed for mounting the opposed axial side of the gasket 1 on the other mounting member 5. After that, the mounting members 3 and 5 are coupled to each other with fastening tools such as bolts (not shown) with the gasket 1 therebetween.

Thus, the gasket 1 is first mounted on the mounting member 3 and next on the other mounting member 5 so that it connects the mounting member 3 with the other mounting member 5.

During the procedures, the gasket 1 and the mounting member 3 receive external forces in the axial direction. The forces can press the second sealing surface 62 on the first sealing surface 27 while the outer protrusion 44 is pressed in the groove 17.

Pressing the outer protrusion 44 in the groove 17 can generate radial sealing forces between the outer protrusion 44 and the inner sleeve 15, and if necessary, between the outer protrusion 44 and the outer sleeve 13, to seal gaps at least between the outer protrusion 44 and the inner sleeve 15.

In addition, pressing the second sealing surface 62 on the first sealing surface 27 can generate axial sealing forces between the sealing surfaces 62 and 27, i.e. between the inner sleeve 15 and the inner protrusion 46 to seal gaps therebetween.

That is, the structure for mounting the gasket on the mounting member can generate the axial sealing forces in addition to the radial sealing forces. This can enhance sealing performance between the gasket 1 and the mounting member 3.

The invention does not limit the method for pressing the inner protrusion of the gasket on the inner sleeve of the mounting member to a particular one. For example, the pressing may be achieved by an external force applied to the gasket 1 with a tool and the like when the outer protrusion 44 of the gasket 1 is pressed in the groove 17 of the mounting member 3.

Figure 4:
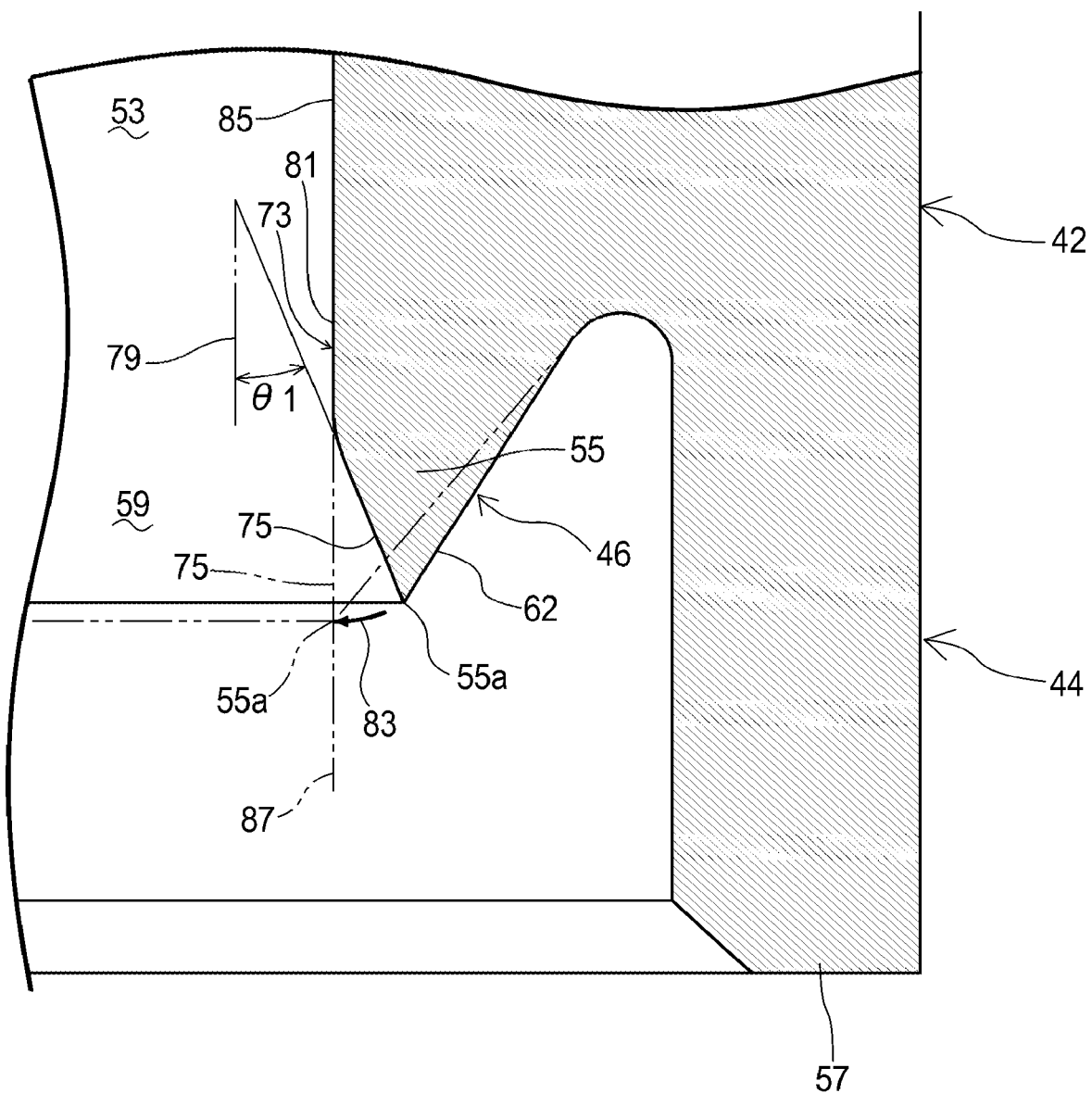
FIG. 4 is a partial enlarged view of the gasket of FIG. 3.

FIG. 4 is a partial enlarged view of the gasket 1 of FIG. 3. FIG. 5 is a cross-section view of the gasket 1 and the mounting member 3 before the gasket 1 is mounted on the mounting member 3.

As shown in FIGS. 3 and 4, when the inner protrusion 46 of the gasket 1 contacts the inner sleeve 15 of the mounting member 3 to communicate the fourth fluid channel 59 with the second fluid channel 23, the inner periphery of the inner sleeve 15 forms a wall 71 of the second fluid channel 23 and the inner periphery of the inner protrusion 46 forms a wall 73 of the fourth fluid channel 59.

The tip 55 of the inner protrusion 46 of the gasket 1 has an inner diameter equal to or larger than the minimum inner diameter D1 of the inner sleeve 15 of the mounting member 3.

The inner periphery of the inner protrusion 46 of the gasket 1 has a first inner peripheral surface 75, which is inclined to reduce the inner diameter of the inner protrusion 46 with increase in axial distance from the distal end 55a of the tip 55, i.e. vertical distance from the lower end of FIG. 1.

The inner periphery of the inner sleeve 15 of the mounting member 3 includes the wall 71 of the second fluid channel 23, which has a diameter substantially equal to the minimum inner diameter D1 of the inner sleeve 15.

The inner periphery of the inner protrusion 46 of the gasket 1 includes the wall 73 of the fourth fluid channel 59, which has a diameter equal to or larger than the inner diameter D2 of the second base 42.

The inner diameter D2 of the second base 42 is substantially equal to the minimum inner diameter D1 of the inner sleeve 15.

The first inner peripheral surface 75 is a portion of the wall 73 of the fourth fluid channel 59. The first inner peripheral surface 75 is formed in an annular shape extending along the whole circumference of the inner periphery of the inner protrusion 46 and facing the fourth fluid channel 59.

The first peripheral surface 75 extends axially from the second axial portion of the inner protrusion 46 toward the distal end 55a of the tip 55.

The first inner peripheral surface 75 is tapered, and its cross section including the axis 67 (of the inner protrusion 46) of the gasket 1 is inclined at an angle $\theta 1$ with respect to a virtual line 79 parallel to the axis 67.

Accordingly, the second axial end of the inner protrusion 46, i.e. its end nearer to the second base 42, has the minimum inner diameter D3, and the first axial end of the inner protrusion 46, i.e. the distal end 55a of the tip 55, has the maximum inner diameter D4.

The minimum inner diameter D3 of the inner protrusion 46 is substantially equal to the inner diameter D2 of the second base 42. The maximum inner diameter D4 of the inner protrusion 46 is larger than the inner diameter D2 of the second base 42, i.e. the minimum inner diameter D1 of the inner sleeve 15.

The relationship between the minimum inner diameter D3 of the inner protrusion 46 and the minimum inner diameter D1 of the inner sleeve 15 is not limited to the above-described one. The minimum inner diameter D1 of the inner sleeve 15 may be larger or smaller than the inner diameter of the inner sleeve 15, if the difference in inner diameter does not obstruct the flow of the fluids.

When the first inner peripheral surface 75 is a linearly tapered surface, a smoothly curved (i.e. rounded) surface is provided at the boundary between the first inner peripheral surface 75 and an inner periphery 81 of the second axial portion of the inner protrusion 46, i.e. its portion nearer to the second base 42.

The inner protrusion 46 is flexible to be deformed to reduce the angle $\theta 1$. More specifically, the inner protrusion 46 can move the tip 55 radially inward, i.e. toward the direction of an arrow 83 in FIG. 4, by being bent at a point near the boundary between the inner protrusion 46 and the second base 42, i.e. near the proximal end of the tip 55.

The inner protrusion 46 is deformed when the first sealing surface 27 is pressed on the second sealing surface 62. Preferably, the deformed inner protrusion 46 moves the first inner peripheral surface 75 to a position near an extension 87 of an inner periphery 85 of the second base 42, i.e. reduces the inclination angle $\theta 1$ to zero.

The outer protrusion 44 of the gasket 1 is displaced from the position where it is separated from the mounting member 3, as shown in FIG. 5, to the position where it is pressed in the groove 17 of the mounting member 3, as shown in FIGS. 1 and 2. Then, the outer protrusion 44 pushes the inner sleeve 15 of the mounting member 3 radially inward, and the inner sleeve 15 pushes the inner protrusion 46 of the gasket 1 radially inward, i.e. toward the axis 67.

As a result, the inner protrusion 46 of the gasket 1, esp. its tip 55, is deformed to move the first inner peripheral surface 75 toward the radial inside of the inner protrusion 46, i.e. the radial inside of the gasket 1. The deformation of the inner protrusion 46 changes the tapered shape of the first inner peripheral surface 75, which increases its inner diameter with decrease in distance from the distal end 55a of the tip 55, into a shape substantially parallel to the axis 67.

Since the first inner peripheral surface 75 before deformed is inclined to reduce the inner diameter of the inner protrusion 46 with increase in axial distance from the first axial (i.e. lower) end of the inner protrusion 46, it is possible to prevent the inner protrusion 46 pushed radially inward from protruding from the wall 73 of the fourth fluid channel 59 toward the inside of the fourth fluid channel 59, i.e. the fluid channel of the gasket 1.

After the two mounting members 3 and 5 are coupled to each other, the fluids flow between the mounting member 3 and the gasket 1. In this case, no obstructions against the flow of the fluids exist in the volume where the mounting member 3 communicates with the gasket 1. This can ensure smoothness of the flow of the fluids, thus being able to quickly replace the fluids flowing between the mounting member 3 and the gasket 1.

The first inner peripheral surface 75 can prevent a deformed portion of the inner protrusion 46 from protruding toward the fourth fluid channel 59, i.e. the fluid channel of the gasket 1, and interrupting the flow of the fluids between the gasket 1 and the mounting member 3. This can remove backwaters from the junction between the gasket 1 and the mounting member 3 to quickly replace the fluids. As a result, it is possible to prevent the backwaters from depositing components of the fluids and creating particles from the components.

Figure 6:
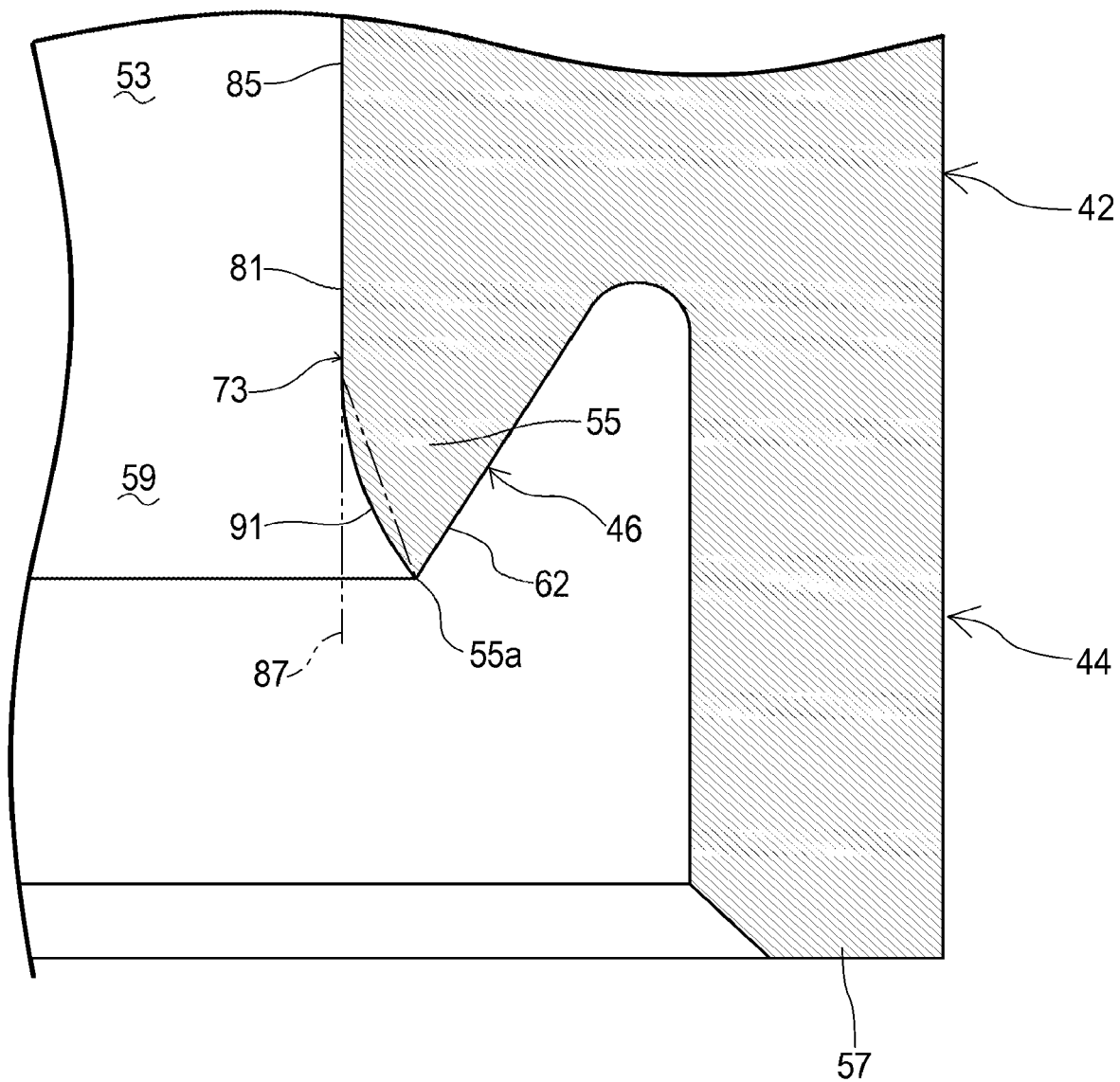
FIG. 6 is a partial cross-section view of a gasket according to another embodiment in the gasket-mounting structure of FIG. 1.

The inner peripheral surface of the inner protrusion of the gasket according to the invention is not limited to the first inner peripheral surface 75, i.e. the tapered surface in the above-described embodiment. For example, the inner peripheral surface may be a convex curved surface 91 as shown in FIG. 6. In a cross section of the gasket 1 including its axis 67, the convex curved surface 91 is convex toward the radial inside of the gasket 1.

When the outer protrusion 44 of the gasket 1 is pressed in the groove 17 of the mounting member 3, the deformed first inner peripheral surface 91 can be smoother than the deformed first inner peripheral surface 75 to maintain a constant cross-section area of the fourth fluid channel 59 of the inner protrusion 46 with a higher degree of accuracy. Accordingly, the first inner peripheral surface 91 can further enhance smoothness of the flows of the fluids in the fluid channel of the gasket 1.

The first inner peripheral surface of the gasket according to the invention is not limited to the first inner peripheral surface 75 at the first axial (i.e. lower) portion of the inner periphery of the inner protrusion 46, i.e. at the tip 55. For example, the inner peripheral surface may axially extend along the whole length of the inner periphery of the inner protrusion 46.

The first inner peripheral surface of the gasket according to the invention is not limited to the first inner peripheral surface 75 inclined uniformly at the angle θ1 in the cross section of the gasket including its axis. For example, the first inner peripheral surface may include a combination of planes inclined at different angles, a combination of tapered surfaces and convex curved surfaces, or both the combinations.

The above-described explanation teaches that the invention can obviously have variations and modifications. Accordingly, it should be understood that the invention can have embodiments other than those in the description within the scope of the claims attached to the description.

LIST OF REFERENCE NUMBERS 1 gasket; 3 mounting member; 5 other mounting member; 11 first base; 13 outer sleeve; 15 inner sleeve; 17 groove; 23 second fluid channel (fluid channel of inner sleeve of mounting member); 42 second base; 44 outer protrusion; 46 inner protrusion; 55 tip of inner protrusion; 59 fourth fluid channel (fluid channel of inner protrusion of gasket); 71 wall of second fluid channel; 73 wall of fourth fluid channel; 75 first inner peripheral surface

What is claimed is:

1. A gasket-mounting structure comprising:
   a mounting member including:
      a first base having a fluid channel;
      an outer sleeve protruding from the first base;
      an inner sleeve protruding from the first base in the same direction as the outer sleeve radially inside the outer sleeve and having a hole communicating with the fluid channel; and
      a groove surrounded by the first base, the outer sleeve, and the inner sleeve and open to the direction in which the outer sleeve protrudes; and
   a gasket including:
      an annular second base;
      an annular outer protrusion extending from the second base to be pressed in the groove of the mounting member; and
      an annular inner protrusion extending from the second base to be axially pressed on the inner sleeve of the mounting member radially inside the outer protrusion such that the inner sleeve is radially placed between the outer protrusion and the inner protrusion, wherein:
   the inner sleeve of the mounting member includes a first sealing surface that is an annular tapered surface located at an inner periphery of a tip of the inner sleeve and extending along a whole circumference of the tip of the inner sleeve, and a diameter of the first sealing surface increases with an increase in axial distance from the first base of the mounting member;
   the inner protrusion of the gasket includes a second sealing surface that is an annular tapered surface located at an outer periphery of a tip of the inner protrusion and extending along a whole circumference of the tip of the inner protrusion, and a diameter of the second sealing surface decreases with an increase in axial distance from the second base of the gasket to allow the second sealing surface to be axially pressed on the first sealing surface;
   an inner periphery of the inner protrusion has a first inner peripheral surface that,
      when the first sealing surface is separated from the second sealing surface, is inclined at an angle with respect to an axial direction of the inner protrusion to reduce an inner diameter of the inner protrusion with increase in axial direction from the tip of the inner protrusion, the angle being smaller than an inclination angle of the second sealing surface, and
      when the first sealing surface is pressed on the second sealing surface, is deformed to reduce the angle to zero.

2. The gasket-mounting structure according to claim 1, wherein:
   when the inner sleeve of the mounting member contacts the inner protrusion of the gasket, an inner periphery of the inner sleeve and an inner periphery of the inner protrusion form walls of fluid channels communicating with each other; and
   a tip of the inner protrusion has an inner diameter equal to or larger than the minimum inner diameter of the inner sleeve.

3. The gasket-mounting structure according to claim 1, wherein the first inner peripheral surface is tapered.

4. The gasket-mounting structure according to claim 1, wherein the first inner peripheral surface is convex toward the radial inside of the gasket, and
   the angle of the first inner peripheral surface is an angle formed by the axial direction of the inner protrusion and a straight line between both axial ends of the first inner peripheral surface.

* * * * *